(12) United States Patent
Mikkola et al.

(10) Patent No.: US 7,027,518 B2
(45) Date of Patent: Apr. 11, 2006

(54) METHOD AND ARRANGEMENT FOR PROVIDING OPTIMAL BIT PROTECTION AGAINST TRANSMISSION ERRORS

(75) Inventors: Hannu J. Mikkola, Tampere (FI); Janne Vainio, Lempäälä (FI); Jani Rotola-Pukkila, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 818 days.

(21) Appl. No.: 10/021,748

(22) Filed: Oct. 29, 2001

(65) Prior Publication Data

US 2002/0075966 A1 Jun. 20, 2002

(30) Foreign Application Priority Data

Oct. 31, 2000 (FI) .................................. 20002399

(51) Int. Cl.
*H04L 27/00* (2006.01)
*H04B 15/00* (2006.01)

(52) U.S. Cl. ........................ 375/259; 375/285

(58) Field of Classification Search ................ 375/240, 375/262, 285, 295, 341, 343, 346; 371/43.1; 704/227; 714/751, 755
See application file for complete search history.

(56) References Cited

U.S. PATENT DOCUMENTS

| 5,867,538 | A | * | 2/1999 | Liu | 375/341 |
| 6,230,124 | B1 | * | 5/2001 | Maeda | 704/227 |
| 6,233,713 | B1 | | 5/2001 | Van Den Berghe et al. | 714/790 |
| 6,298,085 | B1 | * | 10/2001 | Kondo et al. | 375/240 |
| 6,438,723 | B1 | * | 8/2002 | Kalliojarvi | 714/751 |
| 6,470,470 | B1 | * | 10/2002 | Jarvinen et al. | 714/755 |

(Continued)

FOREIGN PATENT DOCUMENTS

EP 1059755 A1 12/2000

(Continued)

OTHER PUBLICATIONS

"A Rate Adaptive Convolutional coding Method For Multicarrier DS/CDMA Systems", Ju Mi Lee et al., 2000, MtlCOM 2000 Proceedings.

*Primary Examiner*—Emmanual Bayard
*Assistant Examiner*—Lawrence B. Williams
(74) *Attorney, Agent, or Firm*—Perman & Green, LLP

(57) ABSTRACT

A method and arrangements are provided for transmitting frames of digital information over a wireless communication connection between a transmitter and a receiver. In the transmitter, a certain sequence of bits within each frame of digital information is convolutionally encoded and punctured before transmitting the frame over a wireless communication connection. The receiver decodes and depunctures the sequence of bits within each frame of digital information, that was convolutionally encoded and punctured, after receiving the frame over a wireless communication connection. The transmitter rearranges the sequence of bits within each frame of digital information that is to be convolutionally encoded and punctured, before convolutionally encoding and puncturing it. The rearranged order is one that has been found to produce, during the course of convolutionally encoding with a certain convolutional code and puncturing with a certain puncturing pattern, a convolutionally encoded and punctured sequence where the statistical probability of transmission errors exhibits a predefined behavior. In the receiver, the sequence of bits within each frame of digital information that was so rearranged in the transmitter is inversely rearranged so that the effect of said rearranging in the transmitter on the mutual order of the bits of the sequence is cancelled, after decoding and depuncturing the sequence of bits.

10 Claims, 7 Drawing Sheets

U.S. PATENT DOCUMENTS

| | | | |
|---|---|---|---|
| 6,522,696 B1 * | 2/2003 | Mobin et al. | 375/262 |
| 6,791,966 B1 * | 9/2004 | Mikkola et al. | 370/343 |
| 2002/0090022 A1 * | 7/2002 | Yano et al. | 375/130 |
| 2003/0106006 A1 * | 6/2003 | Kwon et al. | 714/746 |
| 2003/0221156 A1 * | 11/2003 | Berger et al. | 714/755 |

FOREIGN PATENT DOCUMENTS

| | | |
|---|---|---|
| WO | WO 97/14235 | 4/1997 |
| WO | WO 99/39442 | 8/1999 |
| WO | WO 99/48237 | 9/1999 |
| WO | WO 00/35136 | 6/2000 |

* cited by examiner

METHOD AND ARRANGEMENT FOR PROVIDING OPTIMAL BIT PROTECTION AGAINST TRANSMISSION ERRORS

TECHNOLOGICAL FIELD

The invention concerns generally the technology of protecting bits against transmission errors in a digital wireless communications system. Especially the invention concerns the task of ensuring that the degree of protection that each bit enjoys in a unit of digital information to be transmitted is commensurate to its relative importance within said unit of digital information.

BACKGROUND OF THE INVENTION

Digital wireless transmitters, such as the radio transmitters used in the mobile stations and base stations of cellular radio systems, handle digital information in discrete units that are usually referred to as frames. In an exemplary case where the digital information to be transmitted represents a speech signal, a frame contains all information that a receiving station needs to reproduce a short time interval of speech. A typical length of such an interval is 20 milliseconds.

The bits of a frame have different importances in relation to the subjective speech quality that can be reproduced. There may be such bits or bit sequences without the correct form of which it becomes completely impossible to reproduce the short time interval of speech in a meaningful way. On the other hand the frame may also contain such bits or bit sequences which are certainly needed to completely reproduce the short time interval of speech with high fidelity, however so that an error in these bits or bit sequences only causes a small distortion to the subjective speech quality that a human listener experiences.

From prior art it is known to recognize the different importances of different bits and to provide different degrees of protection against transmission errors depending on the relative importance of the bits. FIG. 1 is a partial schematic diagram of a prior art digital transmitter where a source encoder 101 generates a source encoded bit stream. If the transmitter of FIG. 1 is used to digitize and transmit speech, the source encoder 101 is a speech encoder that implements some algorithm like linear predictive coding to convert a speech signal into a source encoded bit stream. This bit stream goes into the channel encoder 102 that introduces redundancy thereto. The purpose of channel coding is to protect the digital information against transmission errors, i.e. to enable the receiving station to reproduce the original bit values as reliably as possible and to at least detect and possibly also to correct any transmission errors that occurred within the transmission channel. An interleaving, burst forming and modulating block 103 takes the channel encoded digital information and converts it into radio frequency bursts that can be transmitter over the air.

Within the known channel encoder block 102 of FIG. 1 there is first a re-ordering entity 110 the task of which is to re-order the bits that are to constitute the contents of a frame. The order produced by entity 110 is such that has been considered as optimal regarding the degree of protection against transmission errors and depending on relative importance of the bits. In the example of FIG. 1 the re-ordering entity 110 distributes the bits of a frame into three classes according to decreasing importance: class 1a, class 1b and class 2. Of these, the bits belonging to class 1a are so important that they must be protected with a Cyclic Redundancy Check (CRC) code. A CRC calculation block 111 calculates a CRC checksum over the class 1a bits. This checksum is fed as input information into a convolutional encoding and puncturing block 112 along with the class 1a bits and the class 1b bits themselves. The convolutional encoder 112 encodes the bits input thereto with a certain convolutional code and uses puncturing, i.e. deletes certain convolutionally encoded bits according to a predetermined bit pattern, in order to produce an encoding result where the number of bits per unit time is equal to a certain predefined gross bit rate.

The order in which the convolutional encoding and puncturing is performed is typically such that the class 1a bits are encoded first, the CRC checksum bits immediately thereafter and the class 1b bits only after the CRC checksum bits. The bit range that includes the class 1a bits and CRC checksum bits is usually encoded in the convolutional encoding and puncturing block 112 so that equal error protection performance is achieved for all bit positions within that range. This is because CRC-based error detection has been found to be more effective when the error protection performance is equal for all bit positions than when some bit positions within the CRC-related bit range enjoy better protection performance than some others, such better protection being accomplished at the expense of worsening the protection performance for some other bits in that range.

The encoding result goes into the interleaving, burst forming and modulating block 103 along with the class 2 bits that were not subjected to any CRC calculation or convolutional encoding at all. Combining the CRC protected and/or convolutionally encoded bits to the non-coded class 2 bits is schematically represented in FIG. 1 as the multiplexer 113. The order in which the bits of the various parts of the frame are handled internally in block 102 is shown at the lowest part of FIG. 1: the convolutionally encoded class 1a bits 120 come first, then the convolutionally encoded CRC checksum bits 121, then the convolutionally encoded and punctured class 1b bits and then the class 2 bits. Also within each class the bits of that class are in the order that is determined by their decreasing relative importance to subjective speech quality.

FIG. 2 is a partial schematic diagram of a prior art receiver that is used to receive the transmissions coming from the transmitter of FIG. 1. Received transmissions are demodulated and decomposed from their interleaved burst format into a frame format in block 201. A channel decoder 202 removes the channel coding from each frame and forwards the channel decoded frames to a source decoder 203. The source decoder 203 is the counterpart of the source encoder 101 in the transmitter; for example regarding the transmission of speech it converts an encoded speech signal into a stream of digital samples that is ready for D/A conversion and acoustic reproduction in a loudspeaker. In order to be able to reverse the effects of channel encoding, the channel decoder 202 comprises a demultiplexer 210 that separates the uncoded class 2 bits and sends the rest of the bits into a depuncturing and Viterbi decoding block 211 for removal of the convolutional code. Other decoding methods than Viterbi decoding algorithms exist, but the wide applicability of Viterbi algorithms has made it customary to refer to the decoding of convolutional codes as Viterbi decoding. The output of the depuncturing and Viterbi decoding block 211 comprises the CRC checksum bits, the class 1a bits and the class 1b bits. Of these the two former are taken into a CRC recalculation block 212 that checks, whether the CRC checksum calculated from the received class 1a bits matches that received along them within the frame. A mismatch causes the CRC recalculation block 212 to inform the source decoder about a detected error with a so-called CRC flag. The class 1a, class 1b and class 2 bits, of which the two former have been decoded, all go into a block 213 the purpose of which is to cancel the re-ordering that was accomplished in the re-ordering entity 110 of the transmitter.

The re-ordering and channel encoding arrangements of prior art aim at making the statistical probability of a bit error at a certain bit position a monotonically increasing function of the ordinal number of the bit position within the frame. However, FIG. 3 shows that the prior art arrangement shown in FIG. 1 fails to meet this goal. The curve 301 in FIG. 3 illustrates the statistical probability of a bit error at each bit position for a speech frame of 140 bit positions that was observed when 6812 randomly selected speech frames were taken through a simulated, error-inducing radio channel. These exemplary frames comprised class 1a bits in positions 1 to 52, CRC checksum bits in positions 53 to 62 and class 1b bits in positions 63 to 140. No class 2 bits were included in the frames. FIG. 3 shows that the general trend is correct: the curve 301 shows a generally increasing probability of errors towards the end of the frame. However, the function represented by curve 301 is not monotonously increasing. There are even large local deviations from the intended behaviour of the curve, seen as distinctive peaks upwards and downwards at certain points on the right-hand half of the curve.

SUMMARY OF THE INVENTION

It is an object of the present invention to provide a method and an arrangement for optimising the relation between relative importance of bits and the level of protection that the bits enjoy within a frame structure.

The objects of the invention are achieved by re-ordering those bits the convolutionally encoded representations of which are to be subjected to puncturing.

A first aspect of the invention is a method for transmitting frames of digital information over a wireless communication connection between a transmitter and a receiver. The method according to this aspect of the invention is characterized in what is recited in the characterising portion of the independent claim directed to such a method.

The invention applies also to a method for processing frames of digital information in a transmitter before transmitting them over a wireless communication connection to a receiver. The method according to this second aspect of the invention is characterized in what is recited in the characterising portion of the independent claim directed to such a method.

Additionally the invention applies to a method for generating rearranging and inverse rearranging tables for the purpose of optimizing the probability distribution of transmission errors in transmitting frames of digital information over a wireless communication connection between a transmitter and a receiver. The method according to this third aspect of the invention is characterized in what is recited in the characterising portion of the independent claim directed to such a method.

The invention applies also to a transmitter that is characterized in what is recited in the characterising portion of the independent claim directed to a transmitter.

In the research work that led into the present invention, it was found that puncturing has the tendency of causing deviations to an expected behaviour of the error probability curve that represents the statistical probability of bit errors at each bit position of a frame. Apparently puncturing causes some statistical accumulation of errors into and around certain bit positions. The mechanism is theoretically not easy to understand. However, in the present invention it was found that empirical experience can be used to predict and control the error-inducing effect of puncturing.

According to the invention, a certain range of bits within a frame is rearranged so that the least important bits within that range are placed into those positions for which the probability of bit errors is the largest. The range of bits for which such an operation is accomplished is most advantageously the range that encompasses those bits that are to be subjected to convolutional coding and puncturing but not to CRC checksum calculation. In the parlance of the description of prior art this refers to the class 1b bits.

The rearranging tables according to which the rearranging is done are most advantageously determined through experimentation and/or simulation. A receiver must be aware of the rearranging table that a transmitter uses. This means that either there is only one rearranging table specified for each channel coding arrangement, so that after the communicating parties have directly or indirectly agreed upon the choice of channel coding they are automatically aware of also the applicable rearranging table, or there exist some means for the transmitter and receiver to separately agree upon a rearranging table that they will use. Naturally the receiver must also include a processing entity that is arranged to cancel the effect of such rearranging.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 4:
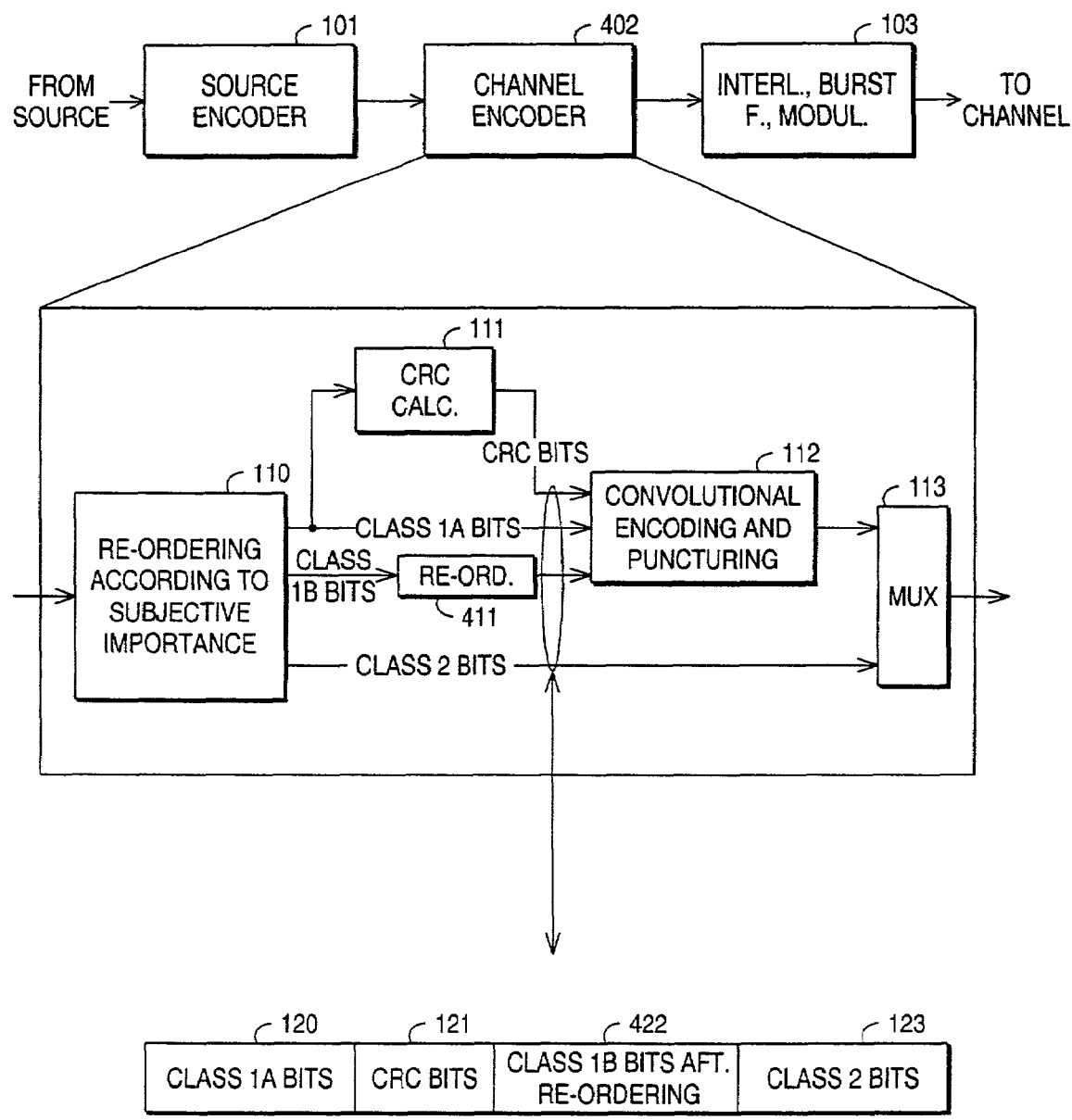
FIG. 4 illustrates the principle of a transmitter according to an embodiment of the invention.

FIG. 4 is a partial schematic diagram of a wireless transmitter according to an embodiment of the invention. The overall structure of the transmitter resembles closely that of a known transmitter: a source encoder 101 generates a source encoded bit stream that goes into channel encoder 402 for adding redundancy thereto. An interleaving, burst forming and modulating block 103 takes the channel encoded digital information and converts it into radio frequency bursts that can be transmitter over the air. Even within the channel encoder block 402 of FIG. 4 there is first the familiar re-ordering entity 110 the task of which is to re-order the bits that are to constitute the contents of a frame. The entity 110 is equal to the corresponding known part in the example of FIG. 1: it distributes the bits of a frame into three classes according to decreasing importance: class 1a, class 1b and class 2. Further, the features of using a CRC calculation block 111 to calculate a CRC checksum over the class 1a bits and feeding this checksum as input information into a convolutional encoding and puncturing block 112 along with the class 1a bits are the same as in FIG. 1.

However, according to the invention the class 1b bits are not fed directly from the re-ordering entity 110 into the convolutional encoding and puncturing block 112. Instead there is, at least conceptually, an additional rearranging block 411 that takes the class 1b bits in their known order produced by the re-ordering entity 110 and rearranges them again into an order that is to be specified in detail below. The rearranged class 1b bits are then fed into the convolutional encoding and puncturing block 112.

Again in accordance with technology that is known as such, the convolutional encoding and puncturing block 112 encodes the bits input thereto with a certain convolutional code and uses puncturing in order to produce an encoding result where the number of bits per unit time is equal to a certain predefined gross bit rate. Similarly in accordance with technology that is known as such, the class 2 bits that are not channel encoded at all go directly from the re-ordering entity 110 into a multiplexer 113 that outputs a frame of bits in the form illustrates at the lowest portion of FIG. 4. Here the difference to the known frame seen in FIG. 1 is that the field 422 that contains the representation of the class 1b bits represents them as a result of additional re-ordering.

We may now analyse the order of bits generated by the additional rearranging element 411 in more detail. Previously we noted that the non-monotonous increase in the probability of bit errors per bit position towards the end of the frame is a result of puncturing, although the connection between a certain puncturing pattern and a certain observed behaviour of the probability of bit errors is theoretically not completely understood. According to the invention it does not need to be completely understood either. It is sufficient to use a relatively large database of typical source encoded frames and assume that the errors that occur in them on their way through an error-inducing channel represents well enough the regularities that will appear in general.

Figure 1:
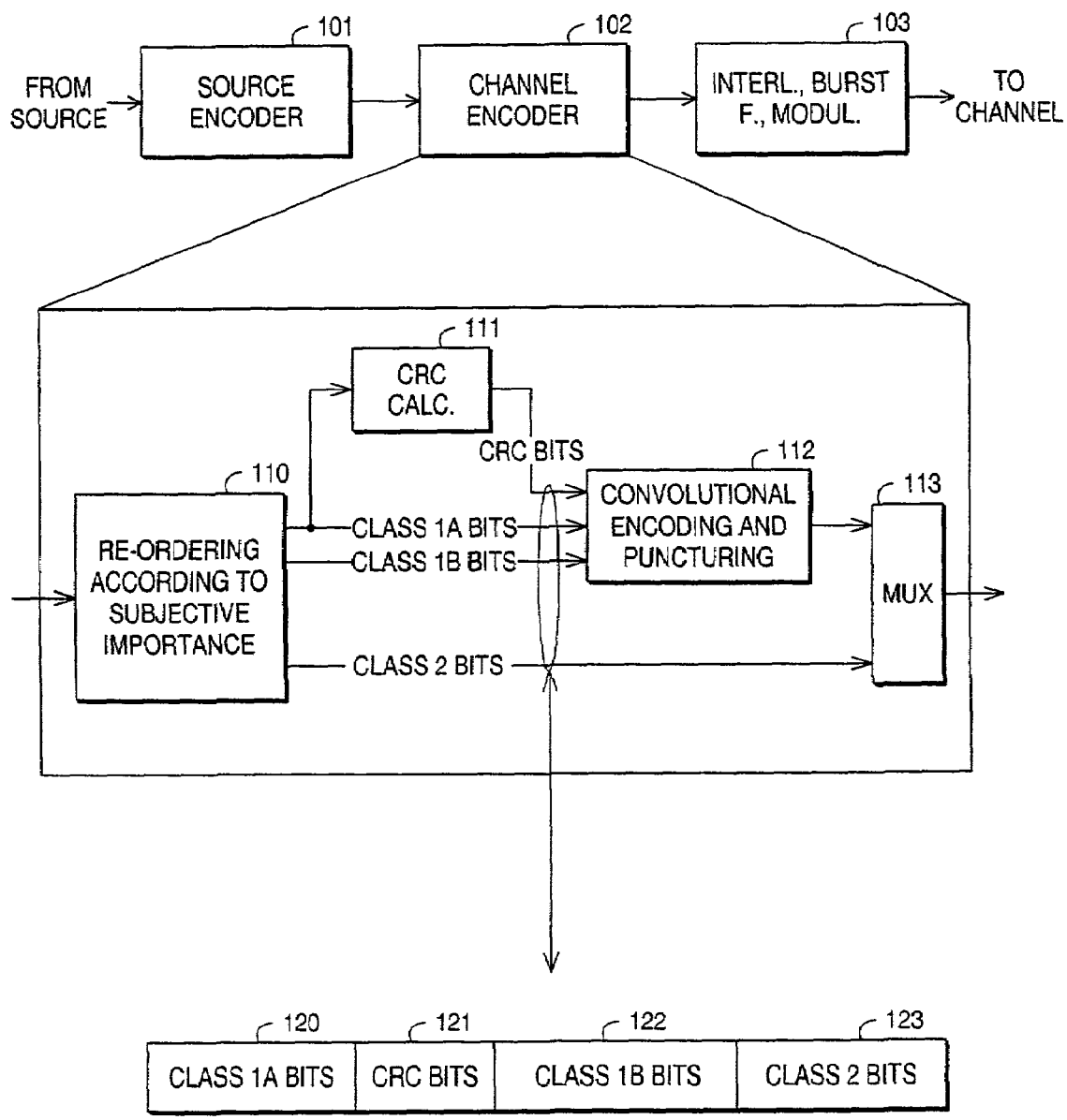
FIG. 1 illustrates a known wireless transmitter.
Figure 5:
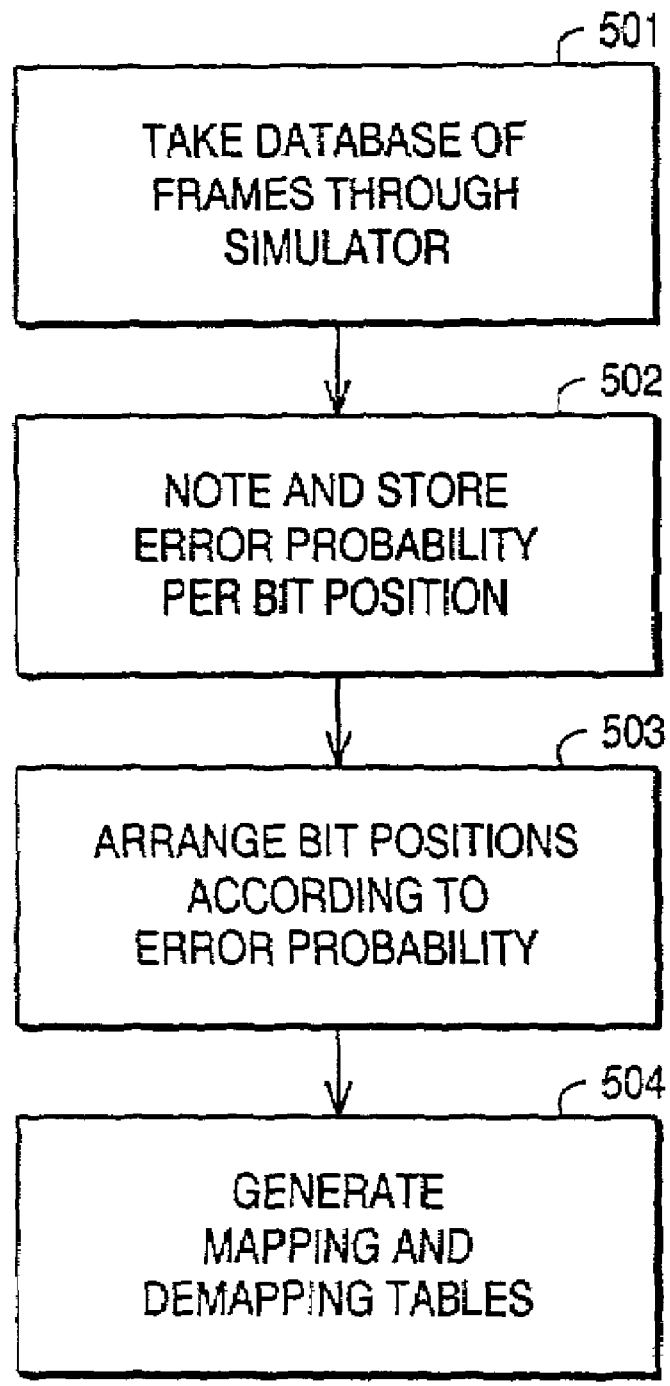
FIG. 5 illustrates the generation of rearranging and inverse rearranging tables according to the invention.

In the flow diagram of FIG. 5 step 501 represents taking such a database of frames and simulating their way through a known transmitter of the kind shown in FIG. 1 and through an error-inducing channel. The frames could equally well be transmitted through a real radio channel between a real transmitter and a real receiver, but it is simpler and more convenient to use a simulator. Step 502 represents observing and storing the statistical probability of bit errors per each bit position. Thereafter it is easy to arrange, at step 503, the bit positions in that part of the frame that contains class 1b bits into an order of ascending observed probability of bit errors. The only additional procedural step that is needed to provide an implementation of the additional rearranging unit 411 is setting up, at step 504, a rearranging table that includes an unambiguous correlation between each individual bit position in the set of class 1b bits coming out of the known re-ordering entity 110 and another bit position in the set of rearranged class 1b bits. According to this rearranging table the first class 1b bit (or more generally: the bit that has the highest importance to the subjective quality of the signal to be reproduced) is mapped into the position where the observed statistical probability of bit errors was the lowest among the 1b class, the next class 1b bit (the bit that has the next highest importance to the subjective quality of the signal to be reproduced) is mapped into the position where the observed statistical probability of bit errors was the next lowest among the 1b class and so on until the bit that has the lowest importance to the subjective quality of the signal to be reproduced is mapped into the position where the observed statistical probability of bit errors was the highest among the 1b class.

An inverse of the rearranging table must also be generated at step 504, because a receiver must be able to cancel the effect of rearranging and this is not possible unless the receiver has access to the correct "demapping" or inverse rearranging table. Next we will describe a receiver according to an advantageous embodiment of the invention that can be used to receive and decode transmissions coming from a transmitter according to FIG. 4.

In an exemplary case the inventors of the present invention produced a rearranging table for frames that had 293 class 1b bits. Such frames are encountered for example in one of the proposed highest-performance modes of the W-AMR (Wideband Adaptive Multirate) speech codec that has been approved, at the priority date of this patent application, to be a standard element of digital cellular telephones related to the 3GPP (3$^{rd}$ Generation Partnership Project). The convolutional encoding and puncturing scheme is in this case such that a block of 368 bits {u(0) . . . u(367)}, consisting of class 1a bits, CRC checksum bits and class 1b bits, is encoded with the ½ rate convolutional code defined by the following polynomials:

G0/G0=1
G1/G0=1+D+D$^3$+D$^4$/1+D$^3$+D$^4$ resulting in 736 coded bits, {C(0) . . . C(735)} defined by:
r(k)=u(k)+r(k−3)+r(k−4)
C(2k)=u(k)
C(2k+1)=r(k)+r(k−1)+r(k−3)+r(k−4)
for k=0, 1, . . . , 367; r(k)=0 for k<0 and (for termination of the coder):
r(k)=0
C(2k)=r(k−3)+r(k−4)
C(2k+1)=r(k)+r(k−1)+r(k−3)+r(k−4)
for k=368, 369, . . . , 371

The code is punctured in such a way that the following 296 coded bits: C(1), C(5), C(7), C(9), C(11), C(17), C(19), C(21), C(23), C(25), C(33), C(35), C(37), C(39), C(41), C(43), C(49), C(51), C(53), C(55), C(57), C(65), C(67), C(69), C(71), C(73), C(75), C(81), C(83), C(85), C(87), C(89), C(97), C(99), C(101), C(103), C(105), C(107), C(113), C(115), C(117), C(119), C(121), C(129), C(131), C(133), C(135), C(137), C(139), C(145), C(147), C(149), C(151), C(153), C(161), C(163), C(165), C(167), C(169), C(171), C(177), C(179), C(181), C(183), C(185), C(193), C(195), C(197), C(199), C(201), C(203), C(209), C(211), C(213), C(215), C(217), C(225), C(227), C(229), C(231), C(233), C(235), C(241), C(243), C(245), C(247), C(249), C(251), C(257), C(259), C(261), C(263), C(265), C(267), C(273), C(275), C(277), C(279), C(281), C(283), C(289), C(291), C(293), C(295), C(297), C(299), C(301), C(305), C(307), C(309), C(311), C(313), C(315), C(321), C(323), C(325), C(327), C(329), C(331), C(333), C(337), C(339), C(341), C(343), C(345), C(347), C(349), C(353), C(355), C(357), C(359), C(361), C(363), C(365), C(369), C(371), C(373), C(375), C(377), C(379), C(385), C(387), C(389), C(391), C(393), C(395), C(397), C(401), C(403), C(405), C(407), C(409), C(411), C(413), C(417), C(419), C(421), C(423), C(425), C(427), C(429), C(433), C(435), C(437), C(439), C(441), C(443), C(445), C(449), C(451), C(453), C(455), C(457), C(459), C(465), C(467), C(469), C(471), C(473), C(475), C(477), C(481), C(483), C(485), C(487), C(489), C(491), C(493), C(497), C(499), C(501), C(503), C(505), C(507), C(509), C(513), C(515), C(517), C(519), C(521), C(523), C(525), C(529), C(531), C(533), C(535), C(537), C(539), C(545), C(547), C(549), C(551), C(553), C(555), C(557), C(561), C(563), C(565), C(567), C(569), C(571), C(573), C(577), C(579), C(581), C(583), C(585), C(587), C(589), C(593), C(595), C(597), C(599), C(601), C(603), C(605), C(609), C(611), C(613), C(615), C(617), C(619), C(625), C(627), C(629), C(631), C(633), C(635), C(637), C(641), C(643), C(645), C(647), C(649), C(651), C(653), C(657), C(659), C(661), C(663), C(665), C(667), C(669), C(673), C(675), C(677), C(679), C(681), C(683), C(685), C(689), C(691), C(693), C(695), C(697), C(699), C(701), C(705), C(707), C(709), C(711), C(713), C(715), C(717), C(721), C(723), C(725), C(727), C(729), C(731), C(733), C(735), C(737), C(739), C(741), C(743) are not transmitted.

In This exemplary case we may designate the class 1b bits before the rearranging according to the invention as an ordered list $\{s(1), s(2), \ldots s(Ks)\}$, where Ks is in this example equal to 293. Similarly we may designate the rearranged class 1b bits as an ordered list $\{d(0), d(1), \ldots d(Kd-1)\}$, where Kd is now also equal to 293. A pseudocode representation for the rearranging operation according to the invention is for j=0 to Kd-1 d(j):=s(table(j)+1);

where table(j) is read line by line, left to right in the following table:

1b bits. Of these the two former are taken into a CRC recalculation block 212 that checks, whether the CRC checksum calculated from the received class 1a bits matches that received along them within the frame. A mismatch causes the CRC recalculation block 212 to inform the source decoder about a detected error with a so-called CRC flag.

According to the invention there is an additional inverse rearranging unit 611 that takes the decoded class 1b bits that come from the depuncturing and Viterbi decoding block 211 and implements a rearranging operation that is the inverse of that made in the rearranging unit 411 of the transmitter. Thereafter the class 1a, class 1b and class 2 bits, of which the two former have been decoded and the class 1b bits also inversely rearranged, all go into a block 213 the purpose of which is to cancel the re-ordering that was accomplished in the re-ordering entity 110 of the transmitter.

Figure 6:
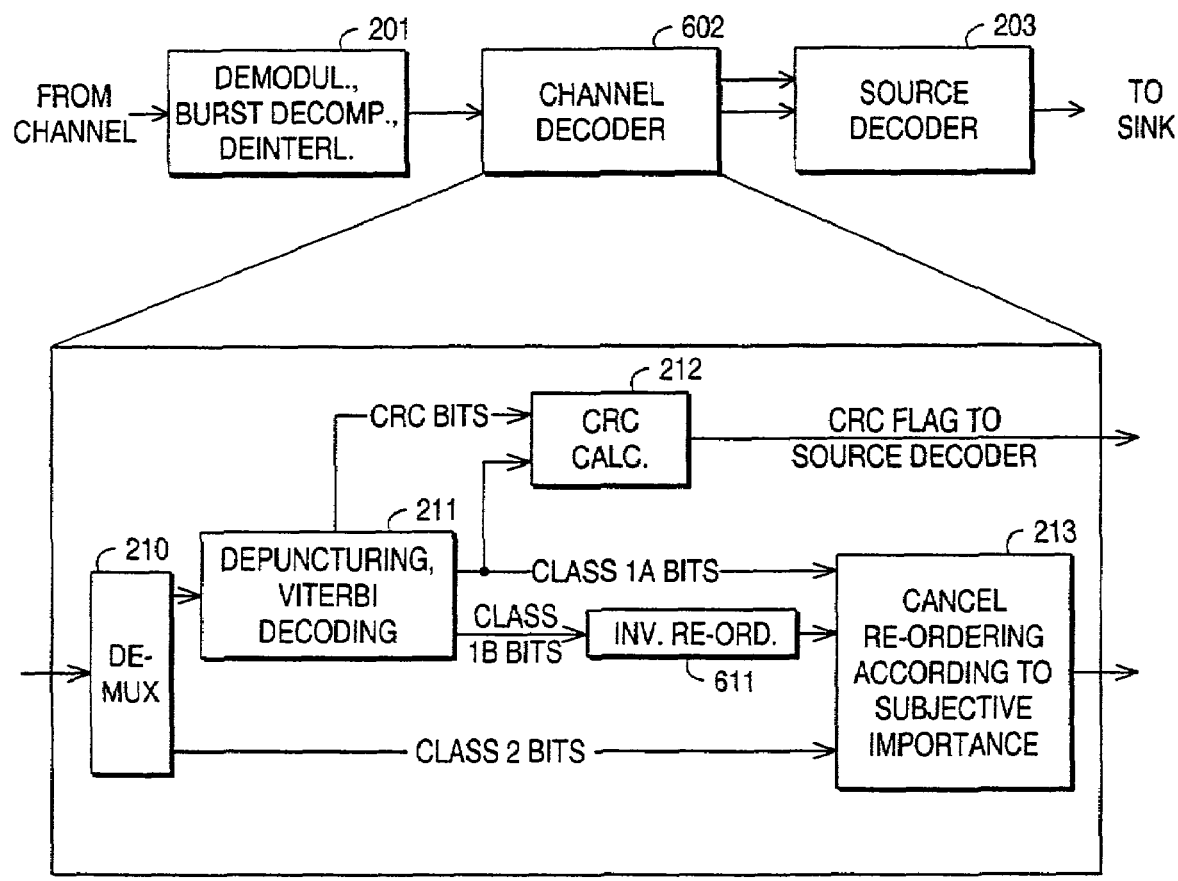
FIG. 6 illustrates the principle of a receiver according to an embodiment of the invention and FIG. 7 illustrates certain observed error probabilities in a transmission arrangement according to the invention.
Figure 7:
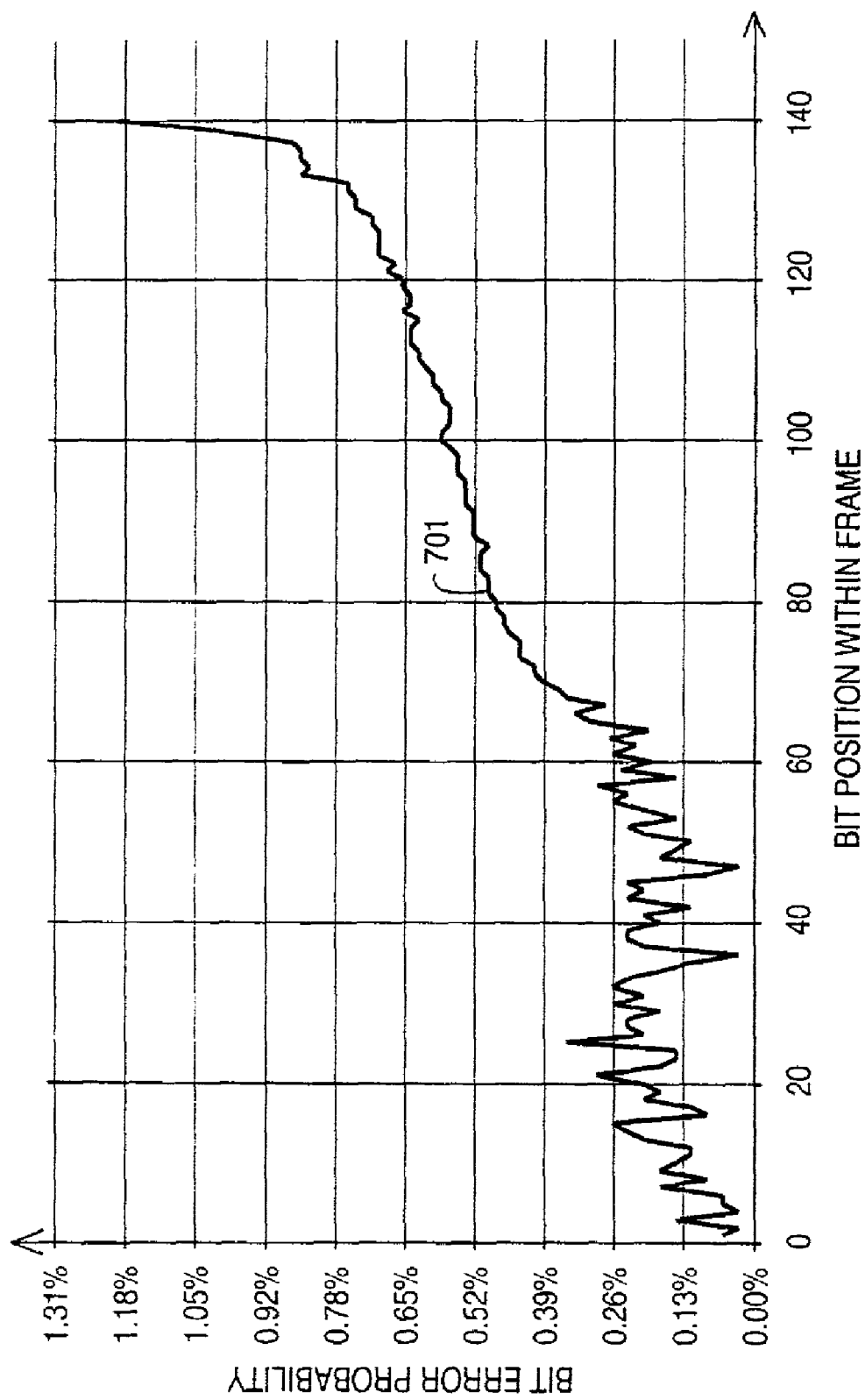

The effect of the invention on the behaviour of error probability per bit position in a frame is clearly seen in FIG. 7, where curve 701 shows the observed error probability per bit position in a frame when a database of 6812 speech frames was taken through a simulated system consisting of a transmitter according to FIG. 4, a simulated, error-inducing channel and a receiver according to FIG. 6. In the right-hand portion of the curve, which represents the class 1b bits affected by the invention, the almost perfect monotony of the curve is clearly seen.

In the foregoing we have assumed that the statistical probability of bit errors should always increase monotonously towards the end of a frame. Such a way of thinking is a consequence of the simple fact that it has been custom-

TABLE 1

| 48 | 8 | 14 | 11 | 10 | 32 | 2 | 12 | 23 | 36 | 0 | 7 | 13 | 26 | 29 | 40 |
|---|---|---|---|---|---|---|---|---|---|---|---|---|---|---|---|
| 51 | 4 | 35 | 43 | 6 | 46 | 20 | 22 | 27 | 5 | 15 | 37 | 44 | 16 | 28 | 30 |
| 31 | 38 | 41 | 1 | 3 | 21 | 33 | 42 | 54 | 55 | 47 | 17 | 18 | 24 | 45 | 50 |
| 52 | 19 | 58 | 9 | 53 | 63 | 64 | 67 | 25 | 56 | 60 | 66 | 146 | 68 | 106 | 39 |
| 88 | 76 | 62 | 72 | 75 | 174 | 186 | 82 | 218 | 288 | 49 | 185 | 290 | 265 | 59 | 268 |
| 289 | 61 | 154 | 284 | 34 | 110 | 144 | 243 | 255 | 65 | 74 | 226 | 57 | 83 | 99 | 112 |
| 135 | 167 | 219 | 132 | 139 | 198 | 251 | 84 | 202 | 232 | 236 | 253 | 274 | 87 | 96 | 123 |
| 217 | 220 | 282 | 283 | 100 | 102 | 105 | 118 | 140 | 152 | 178 | 78 | 94 | 237 | 258 | 271 |
| 276 | 286 | 104 | 114 | 147 | 163 | 184 | 223 | 235 | 103 | 117 | 194 | 200 | 228 | 267 | 272 |
| 92 | 95 | 143 | 150 | 164 | 179 | 192 | 205 | 225 | 287 | 291 | 89 | 137 | 151 | 193 | 209 |
| 212 | 234 | 239 | 262 | 145 | 230 | 116 | 131 | 170 | 191 | 254 | 275 | 71 | 80 | 107 | 111 |
| 177 | 240 | 260 | 261 | 280 | 79 | 158 | 160 | 181 | 190 | 216 | 238 | 250 | 77 | 90 | 129 |
| 134 | 148 | 204 | 227 | 246 | 252 | 259 | 91 | 101 | 159 | 180 | 183 | 214 | 224 | 247 | 279 |
| 69 | 85 | 115 | 188 | 207 | 210 | 213 | 221 | 203 | 206 | 208 | 263 | 273 | 119 | 122 | 81 |
| 127 | 138 | 244 | 264 | 245 | 73 | 98 | 156 | 157 | 171 | 70 | 165 | 173 | 199 | 222 | 266 |
| 270 | 93 | 109 | 172 | 175 | 136 | 196 | 211 | 108 | 121 | 125 | 133 | 189 | 162 | 166 | 231 |
| 153 | 161 | 233 | 241 | 242 | 168 | 169 | 176 | 195 | 86 | 126 | 128 | 182 | 215 | 97 | 292 |
| 141 | 142 | 187 | 197 | 201 | 269 | 155 | 130 | 249 | 120 | 278 | 124 | 256 | 248 | 277 | 229 |
| 149 | 113 | 257 | 285 | 281 | | | | | | | | | | | |

Figure 2:
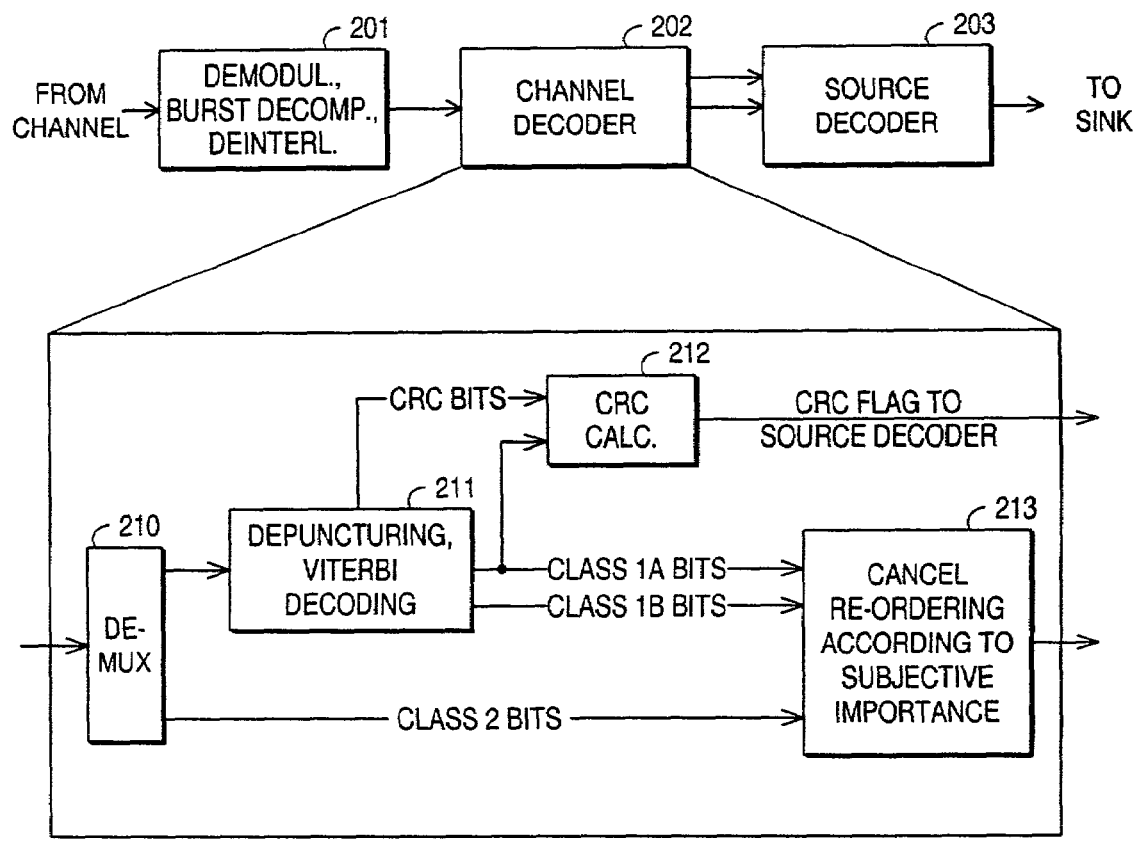
FIG. 2 illustrates a known wireless receiver.
Figure 3:
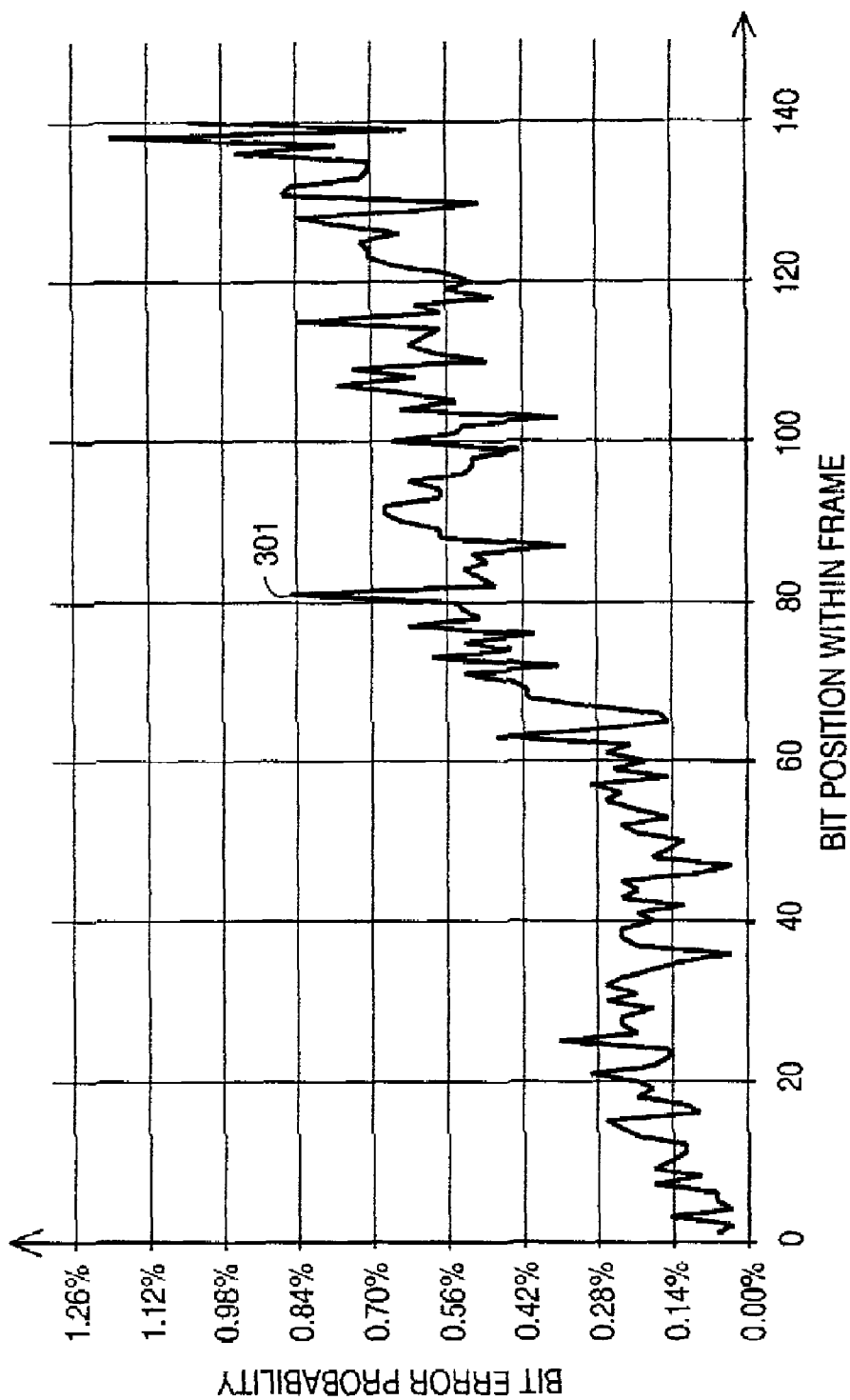
FIG. 3 illustrates certain observed error probabilities in a known transmission arrangement.

FIG. 6 is a partial schematic diagram of a receiver that is used to receive the transmissions coming from the transmitter of FIG. 4. The overall structure resembles that of a prior art receiver shown in FIG. 2. Received transmissions are demodulated and decomposed from their interleaved burst format into a frame format in block 201. A channel decoder 602 removes the channel coding from each frame and forwards the channel decoded frames to a source decoder 203. In order to be able to reverse the effects of channel encoding, the channel decoder 202 comprises a demultiplexer 210 that separates the uncoded class 2 bits and sends the rest of the bits into a depuncturing and Viterbi decoding block 211 for removal of the convolutional code. The output of the depuncturing and Viterbi decoding block 211 comprises the CRC checksum bits, the class 1a bits and the class ary to do so. However, it is possible to e.g. select a puncturing pattern so that most of the error-correcting capability of the channel coding arrangement is concentrated to some other part of a frame (or a class within a frame) than the beginning. The invention is applicable regardless of which part of the frame is selected to involve the best error-correcting capability of the channel coding arrangement.

In the foregoing we have also presented the rearranging operation accomplished in the transmitter and the inverse rearranging operation accomplished in the receiver as something that is made separately from the re-ordering operation of block 110 in the transmitter or the re-ordering cancellation operation of block 213 in the receiver. Although this is the easiest way of presenting the invention so that the differences between it and the prior art arrangements are most clearly seen, this does not need to be the case in real life transmitters and receivers. Since also the re-ordering operation of block 110 in the transmitter and the re-ordering cancellation operation of block 213 in the receiver are inherently usable to affect the order of bits within a frame, it is possible to reprogram the processing units that perform these operations so that they additionally perform the operations shown as separate rearranging and inverse rearranging units in FIGS. 4 and 6.

However, there are certain cases in which it is advantageous to keep the rearranging and inverse rearranging units different from the re-ordering operation of block 110 in the transmitter and the re-ordering cancellation operation of block 213 in the receiver. The first of these cases is that where the invention is used to enhance the performance of an existing system where the specifications of the re-ordering operation of block 110 in the transmitter and the re-ordering cancellation operation of block 213 in the receiver have already been fixed. In that case it is not possible to change the already fixed operations any more, but it is possible to add another signal processing operation into both the transmitter and the receiver to adopt the present invention. Another case is such where the invention has been reserved into the proprietary use of a certain manufacturer. When a communication connection is set up between a transmitter and a receiver, these devices may exchange information about their communicational capabilities, among others the capability of implementing the present invention. If it appears that both devices are capable of using the present invention, they may both couple an additional rearranging/inverse rearranging unit into use in addition to the normal re-ordering operation in the transmitter and the re-ordering cancellation operation in the receiver.

Still another case where it may be advantageous to keep the units according to the invention separate is such where several different puncturing patterns are available for use in a communication connection between a transmitter and a receiver depending e.g. on the observed communication conditions. It is characteristic to the invention that a certain pair of rearranging and inverse rearranging tables only works best in association with a certain well-defined puncturing pattern. Both the transmitter and the receiver must be aware of which rearranging table (in the transmitter) and inverse rearranging table (in the receiver) goes together with which puncturing pattern. After some known means have been used to agree upon the puncturing pattern to be adopted, both devices immediately know which rearranging table (in the transmitter) and inverse rearranging table (in the receiver) must be used. Conceptually it is in that case easiest to keep the re-ordering operation in the transmitter and the re-ordering cancellation operation in the receiver constant and to only change the rearranging table in the transmitter and the inverse rearranging table in the receiver according to need.

The exemplary embodiments of the invention presented in this patent application are not to be interpreted to pose limitations to the applicability of the appended claims. Especially we have solely referred to the rearranging and inverse rearranging of certain class 1b bits; the applicability of the invention is wider in the sense that it can be used to optimize the probability distribution of transmission errors in any number of any bits that are subjected to convolutional encoding and puncturing before transmission and corresponding decoding and depuncturing after reception. The verb "to comprise" is used in this patent application as an open limitation that does not exclude the existence of also unrecited features. The features recited in depending claims are mutually freely combinable unless otherwise explicitly stated.

The invention claimed is:

1. A method for transmitting frames of digital information over a wireless communication connection between a transmitter and a receiver, comprising the steps of:
   in the transmitter, convolutionally encoding and puncturing a certain sequence of bits within each frame of digital information before transmitting the frame over a wireless communication connection, and
   in the receiver, decoding and depuncturing the sequence of bits within each frame of digital information that was convolutionally encoded and punctured, after receiving the frame over a wireless communication connection; wherein:
   said step performed in the transmitter comprises the substep of rearranging the sequence of bits within each frame of digital information that is to be convolutionally encoded and punctured, before convolutionally encoding and puncturing it, into an order that has been found to produce, during the course of convolutionally encoding with a certain convolutional code and puncturing with a certain puncturing pattern, a convolutionally encoded and punctured sequence where the statistical probability of transmission errors exhibits a predefined behaviour and
   said step performed in the receiver comprises the substep of inversely rearranging the sequence of bits within each frame of digital information that was so rearranged in the transmitter so that the effect of said rearranging in the transmitter on the mutual order of the bits of the sequence is cancelled, after decoding and depuncturing the sequence of bits.

2. A method according to claim 1, wherein the rearranging of the sequence of bits within each frame of digital information is made into an order that has been found to produce, during the course of convolutionally encoding with a certain convolutional code and puncturing with a certain puncturing pattern, a convolutionally encoded and punctured sequence where the statistical probability of transmission errors increases essentially monotonously towards the end of said convolutionally encoded and punctured sequence.

3. A method according to claim 1, comprising the steps of:
   in the transmitter, dividing the digital information belonging to each frame into at least two classes, of which only the bits belonging to one class are subjected to said rearranging before convolutionally encoding and puncturing and
   in the receiver, combining the digital information belonging to each frame from at least two classes, of which only the bits belonging to one class are subjected to said inverse rearranging after decoding and depuncturing.

4. A method according to claim 3, comprising the steps of:
   in the transmitter, calculating a checksum over the bits belonging to one class that is not subjected to said rearranging before convolutionally encoding and puncturing, and adding said checksum into the frame of digital information to be transmitted to the receiver, and
   in the receiver, recalculating a checksum over the bits belonging to said one class that is not subjected to said rearranging after decoding and depuncturing, and comparing the recalculated checksum to a checksum received within the frame of digital information received from the transmitter in order to find out, whether transmission errors occurred among the bits over which the checksum was calculated.

5. A method according to claim 3, comprising the steps of:
in the transmitter, producing in said dividing step a certain predefined class of bits and inserting the bits belonging to this predefined class of bits into the frame of digital information to be transmitted to the receiver without subjecting them to either rearranging, convolutional encoding or puncturing and
in the receiver, combining the digital information belonging to each frame also from bits that are not subjected to either decoding, depuncturing or inverse rearranging.

6. A method for processing frames of digital information in a transmitter before transmitting them over a wireless communication connection to a receiver, comprising the steps of:
convolutionally encoding and puncturing a certain sequence of bits within each frame of digital information before transmitting the frame over a wireless communication connection,
before convolutionally encoding and puncturing the sequence of bits within each frame of digital information that is to be convolutionally encoded and punctured, rearranging it into an order that has been found to produce, during the course of convolutionally encoding with a certain convolutional code and puncturing with a certain puncturing pattern, a convolutionally encoded and punctured sequence where the statistical probability of transmission errors exhibits a predefined behaviour.

7. A method according to claim 5, wherein the rearranging of the sequence of bits within each frame of digital information is made into an order that has been found to produce, during the course of convolutionally encoding with a certain convolutional code and puncturing with a certain puncturing pattern, a convolutionally encoded and punctured sequence where the statistical probability of transmission errors increases essentially monotonously towards the end of said convolutionally encoded and punctured sequence.

8. A method for generating rearranging and inverse rearranging tables for the purpose of optimizing the probability distribution of transmission errors in transmitting frames of digital information over a wireless communication connection between a transmitter and a receiver, comprising the steps of:
simulating the propagation of a number of frames of digital information through an arrangement of a transmitter, an error-inducing channel and a receiver, so that in the transmitter a certain sequence of bits within each frame of digital information is convolutionally encoded and punctured before transmitting the frame over a wireless communication connection and in the receiver the sequence of bits within each frame of digital information that was convolutionally encoded and punctured is decoded and depunctured after receiving the frame over a wireless communication connection,
observing and storing the statistical probability of transmission errors per bit position in the convolutionally encoded and punctured sequence that is produced in the transmitter,
rearranging the bit positions within said certain sequence of bits within each frame of digital information so that the importance to a certain subjective signal quality of each bit position comes to inversely correspond to the observed and stored statistical probability of transmission errors per that bit position and
storing the correspondence between the original bit positions and the rearranged bit positions as a rearranging table and the correspondence between the rearranged bit positions and the original bit positions as an inverse rearranging table.

9. A transmitter for processing frames of digital information before transmitting them over a wireless communication connection to a receiver, comprising:
convolutional encoding and puncturing means for convolutionally encoding and puncturing a certain sequence of bits within each frame of digital information before transmitting the frame over a wireless communication connection, and
rearranging means for rearranging the sequence of bits within each frame of digital information that is to be convolutionally encoded and punctured, before convolutionally encoding and puncturing it, into an order that has been found to produce, during the course of convolutionally encoding with a certain convolutional code and puncturing with a certain puncturing pattern, a convolutionally encoded and punctured sequence where the statistical probability of transmission errors exhibits a predefined behaviour.

10. A transmitter according to claim 9, wherein the rearranging means is made to rearrange the sequence of bits within each frame of digital information that is to be convolutionally encoded and punctured, before convolutionally encoding and puncturing it, into an order that has been found to produce, during the course of convolutionally encoding with a certain convolutional code and puncturing with a certain puncturing pattern, a convolutionally encoded and punctured sequence where the statistical probability of transmission errors increases essentially monotonously towards the end of said convolutionally encoded and punctured sequence.

* * * * *